United States Patent
Thakar et al.

(10) Patent No.: US 10,104,101 B1
(45) Date of Patent: Oct. 16, 2018

(54) METHOD AND APPARATUS FOR INTELLIGENT AGGREGATION OF THREAT BEHAVIOR FOR THE DETECTION OF MALWARE

(71) Applicant: Qualys, Inc., Redwood Shores, CA (US)

(72) Inventors: Sumedh S. Thakar, San Jose, CA (US); Ankur S. Tyagi, Foster City, CA (US); Abhijit V. Limaye, Pune (IN)

(73) Assignee: Qualys, Inc., Foster City, CA (US)

( * ) Notice: Subject to any disclaimer, the term of this patent is extended or adjusted under 35 U.S.C. 154(b) by 0 days.

(21) Appl. No.: 15/581,945

(22) Filed: Apr. 28, 2017

(51) Int. Cl.
*H04L 29/06* (2006.01)
*G06F 21/56* (2013.01)

(52) U.S. Cl.
CPC .......... *H04L 63/1416* (2013.01); *G06F 21/56* (2013.01); *H04L 63/166* (2013.01)

(58) Field of Classification Search
CPC .... H04L 63/1416; H04L 63/166; G06F 21/56
See application file for complete search history.

(56) References Cited

U.S. PATENT DOCUMENTS

| | | | | |
|---|---|---|---|---|
| 6,006,329 A * | 12/1999 | Chi | ................ | G06F 21/564 714/38.1 |
| 8,375,450 B1 * | 2/2013 | Oliver | ................ | G06F 21/56 713/181 |
| 8,479,276 B1 * | 7/2013 | Vaystikh | ................ | G06F 21/577 713/160 |
| 9,165,142 B1 * | 10/2015 | Sanders | ................ | G06F 21/566 |
| 9,762,593 B1 * | 9/2017 | Kennedy | ................ | H04L 63/1416 |
| 2007/0240217 A1 * | 10/2007 | Tuvell | ................ | G06F 21/56 726/24 |
| 2008/0127336 A1 * | 5/2008 | Sun | ................ | G06F 21/564 726/22 |
| 2010/0077481 A1 * | 3/2010 | Polyakov | ................ | G06F 21/552 726/24 |
| 2011/0271341 A1 * | 11/2011 | Satish | ................ | G06F 21/552 726/23 |
| 2012/0323829 A1 * | 12/2012 | Stokes | ................ | G06F 21/563 706/12 |
| 2016/0253500 A1 * | 9/2016 | Alme | ................ | G06F 17/30327 726/23 |
| 2016/0323295 A1 * | 11/2016 | Joram | ................ | G06F 21/566 |
| 2017/0163665 A1 * | 6/2017 | McDougal | ........... | H04L 63/1416 |

* cited by examiner

*Primary Examiner* — Michael Pyzocha
(74) *Attorney, Agent, or Firm* — Baker & McKenzie LLP (57) ABSTRACT

Embodiments disclosed herein are directed to intelligent malware detection. A scanner server is used to scan an endpoint device for malware. Various attributes and behaviors of the endpoint device are identified in retrieved scan data. Identified attributes and behaviors are then evaluated according to a malware detection framework, which is used to determine whether (as well as to what extent) the identified attributes and behaviors are indicative of malware. In this manner, potential security risks associated with the malware may be identified. The framework is constructed through a machine learning process that aggregates attributes and behaviors common amongst members of malware families. Advantageously, the framework enables the scanner server to detect unknown variants of known malware families.

24 Claims, 5 Drawing Sheets

METHOD AND APPARATUS FOR INTELLIGENT AGGREGATION OF THREAT BEHAVIOR FOR THE DETECTION OF MALWARE

TECHNICAL FIELD

The present disclosure relates to a method and apparatus for the intelligent aggregation of threat behavior for the detection of malware.

BACKGROUND

Computing devices are often scanned for the purpose of identifying malware such as computer viruses, threats, and/or other potentially harmful vulnerabilities. However, malware families often spawn new variants that can go undetected by traditional malware detection techniques. As such, an intelligent mechanism for detecting new variants of malware is desired.

BRIEF SUMMARY

In some embodiments, a method is provided, wherein the method comprises: receiving, by at least one processing device of a computing apparatus, a data sample associated with a malware family; executing, by the at least one processing device, the data sample in a secure environment; identifying, by the at least one processing device, an attribute comprised in the data sample; determining, by the at least one processing device, whether the attribute is indicative of the malware family; and adding, by the at least one processing device, the attribute to a node of a framework for detecting the malware family based on determining whether the attribute is indicative of the malware family.

In some embodiments, determining whether the attribute is indicative of the malware family comprises: determining, by the at least one processing device, a match between the attribute and a node entry of the node.

In some embodiments, determining whether the attribute is indicative of the malware family comprises: classifying, by the at least one processing device, the attribute as one of a strong indicator, a moderate indicator, a weak indicator, and a known identifier of the malware family, wherein the node is associated with the one of the strong indicator, the moderate indicator, the weak indicator, and the known identifier.

In some embodiments, the attribute is classified based on an attribute type of the attribute.

In some embodiments, the attribute is classified based on an attribute weight, wherein the attribute weight is determined by: determining, by the at least one processing device, at least one of an attribute type and an occurrence for the attribute, wherein the occurrence is generated based on counting a number of times the attribute occurs in the data sample; assigning, by the at least one processing device, a weight for the attribute based on at least one of the occurrence and the attribute type; and comparing, by the at least one processing device, the weight to a threshold value associated with the node.

In some embodiments, the attribute is added to the node as a hashed value.

In some embodiments, the attribute comprises at least one of an input, a behavior, file properties, a system modification, a file system change, a registry modification, a domain name server (DNS) request, a Transmission Control Protocol (TCP) connection, and an Internet Protocol (IP) connection that is indicative of the malware family.

In some embodiments, a computing apparatus is provided, wherein the computing apparatus comprises: at least one memory comprising instructions; and at least one processing device configured to execute the instructions, wherein executing the instructions causes the at least one processing device to perform the operations of: receiving a data sample associated with a malware family; executing the data sample in a secure environment; identifying an attribute comprised in the data sample; determining whether the attribute is indicative of the malware family; and adding, the attribute to a node of a framework for detecting the malware family based on determining whether the attribute is indicative of the malware family.

In some embodiments, determining whether the attribute is indicative of the malware family comprises: determining, by the at least one processing device, a match between the attribute and an entry of the node.

In some embodiments, determining whether the attribute is indicative of the malware family comprises: classifying, by the at least one processing device, the attribute as one of a strong indicator, a moderate indicator, a weak indicator, and a known identifier of the malware family, wherein the node is associated with the one of the strong indicator, the moderate indicator, the weak indicator, and the known identifier.

In some embodiments, the attribute is classified based on an attribute type of the attribute.

In some embodiments, the attribute is classified based on an attribute weight, wherein the attribute weight is determined by: determining, by the at least one processing device, at least one of an attribute type and an occurrence for the attribute, wherein the occurrence is generated based on counting a number of times the attribute occurs in the data sample; assigning, by the at least one processing device, a weight for the attribute based on at least one of the occurrence and the attribute type; and comparing, by the at least one processing device, the weight to a threshold value associated with the node.

In some embodiments, the attribute is added to the node as a hashed value.

In some embodiments, the attribute comprises at least one of an input, a behavior, file properties, a system modification, a file system change, a registry modification, a domain name server (DNS) request, a Transmission Control Protocol (TCP) connection, and an Internet Protocol (IP) connection that is indicative of the malware family.

In some embodiments, a non-transitory computer-readable medium is provided, wherein the non-transitory computer-readable medium comprises code, wherein the code, when executed by at least one processing device of a computing apparatus, causes the at least one processing device to perform the operations of: receiving a data sample associated with a malware family; executing the data sample in a secure environment; identifying an attribute comprised in the data sample; determining whether the attribute is indicative of the malware family; and adding the attribute to a node of a framework for detecting the malware family based on determining whether the attribute is indicative of the malware family.

In some embodiments, the code that, when executed by the at least one processing device, causes the at least one processing device to perform the operations of determining whether the attribute is indicative of the malware family further causes the at least one processing device to perform the operations of: determining a match between the attribute and a second attribute comprised in the node.

In some embodiments, the code that, when executed by the at least one processing device, causes the at least one processing device to perform the operations of determining whether the attribute is indicative of the malware family further causes the at least one processing device to perform the operations of: classifying the attribute as one of a strong indicator, a moderate indicator, a weak indicator, and a known identifier of the malware family, wherein the node is associated with the one of the strong indicator, the moderate indicator, the weak indicator, and the known identifier.

In some embodiments, the attribute is classified based on an attribute type of the attribute.

In some embodiments, the attribute is classified based on an attribute weight, and wherein the attribute weight is determined by: determining, by the at least one processing device, at least one of an attribute type and an occurrence for the attribute, wherein the occurrence is generated based on counting a number of times the attribute occurs in the data sample; assigning, by the at least one processing device, a weight for the attribute based on at least one of the occurrence and the attribute type; and comparing, by the at least one processing device, the weight to a threshold value associated with the node.

In some embodiments, the attribute is added to the node as a hashed value.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

In the various figures, the same reference numbers are provided for the same system elements, whereas in other instances similar elements shown in different figures may have different reference numbers. The figures and associated description provide a plurality of different embodiments and similar elements among the figures will illustrate to one of ordinary skill in the art the possible functionality and connection of those elements in the multiple and collective embodiments disclosed herein.

DETAILED DESCRIPTION

System Environment

Figure 1:
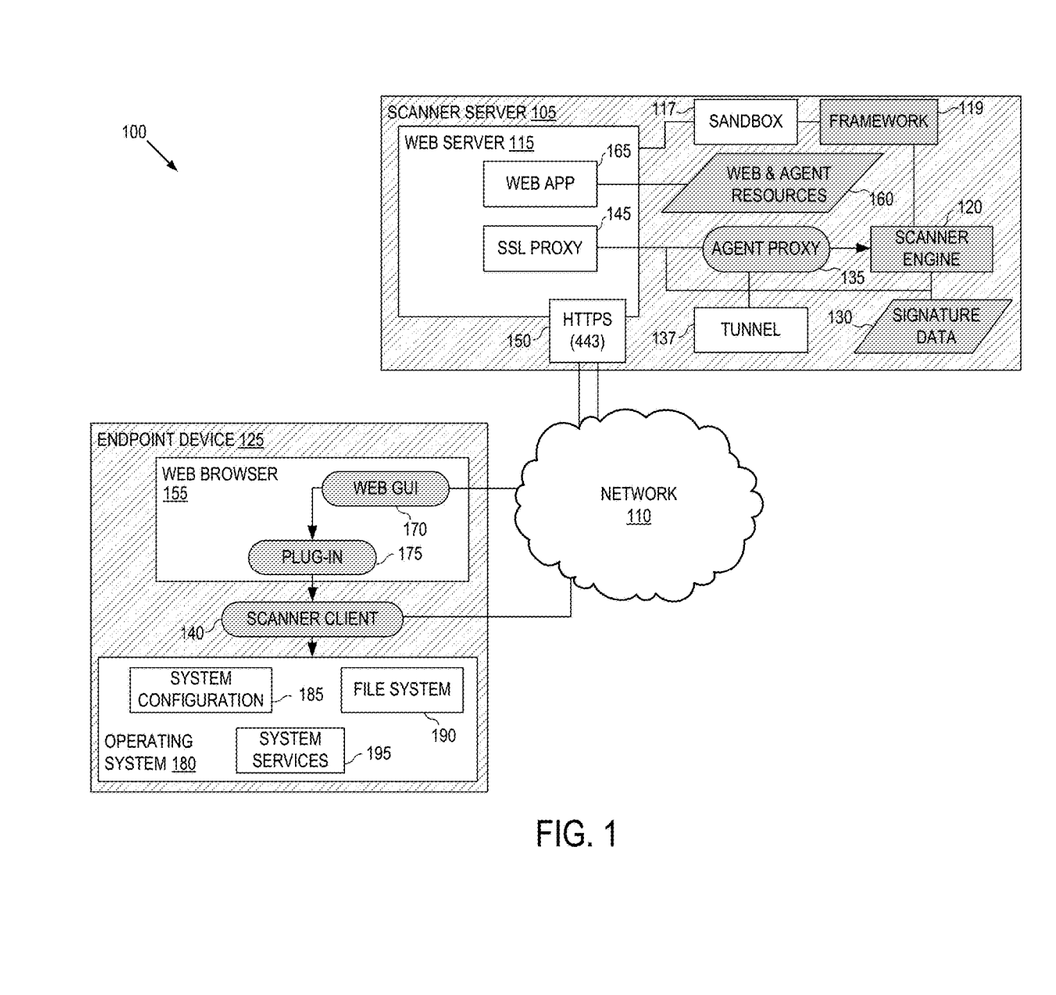
FIG. 1 shows a high level block diagram of one embodiment of a computing system constructed in accordance with the disclosed principles.

Looking initially at FIG. 1, illustrated is a high level block diagram of one embodiment of a system 100 constructed in accordance with the disclosed principles. In the illustrated embodiment, the system 100 may include a scanner server 105 coupled to an open computer network 110. The system 100 may also include an exemplary target endpoint device 125 on which malware detection scans may be run in accordance with the disclosed principles. While a single scanner server is illustrated, the disclosed principles and techniques are of course expandable to multiple scanner servers. Similarly, while a single endpoint device 125 is illustrated, the disclosed principles and techniques are of course expandable to multiple endpoint devices.

In some embodiments, the network 110 may include a plurality of networks. In some embodiments, the network 110 may include any wireless and/or wired communications network that facilitates communication between the scanner server 105 and the target endpoint device 125. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

In some embodiments, the scanner server 105 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The scanner server 105 may include a plurality of computing devices configured to communicate with one another and/or implement load-balancing techniques described herein.

Figure 2:
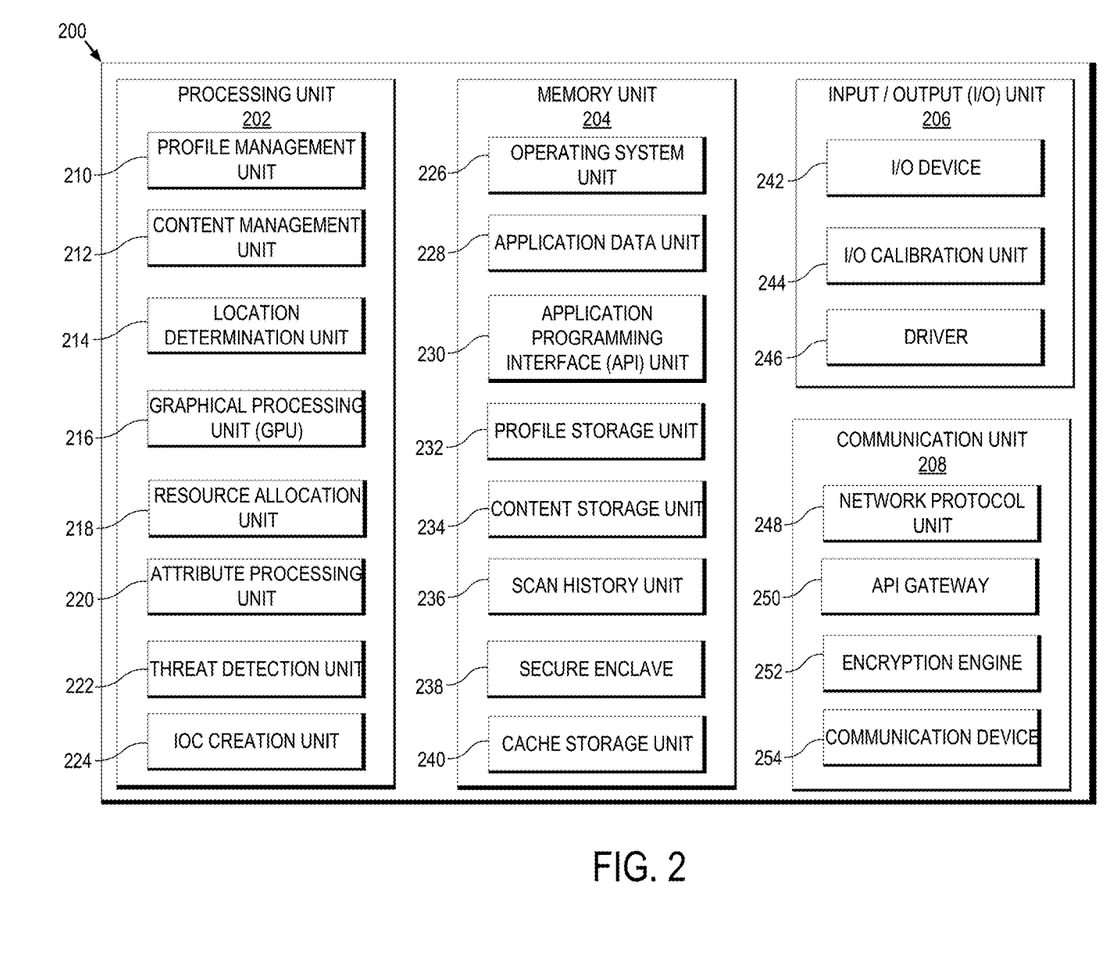
FIG. 2 shows an exemplary functional diagram of a computing environment in accordance with some embodiments of the disclosure.
Figure 3:
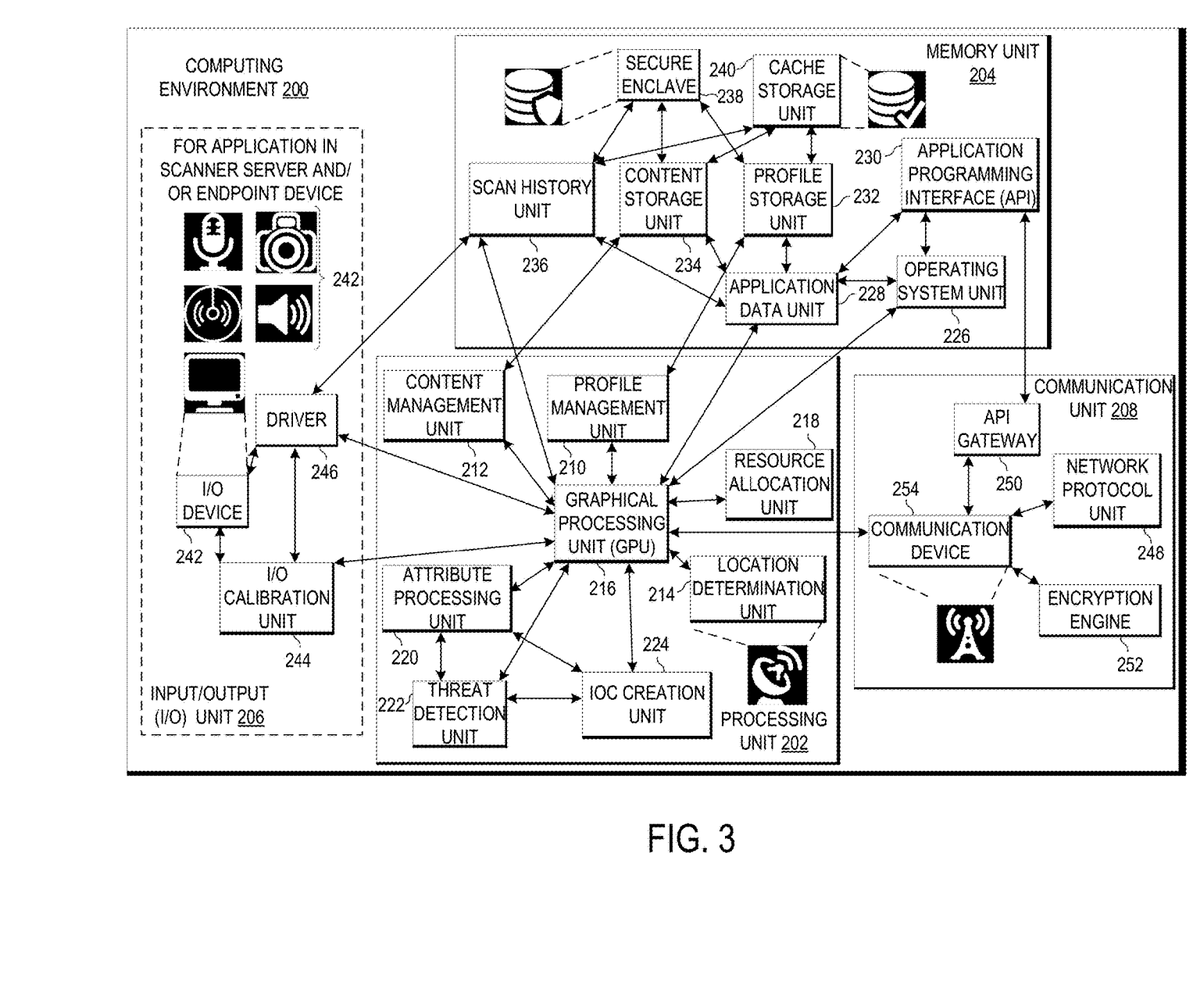
FIG. 3 shows an exemplary connectivity diagram of a computing environment in accordance with some embodiments of the disclosure.

In some embodiments, the scanner server 105 may include various elements of a computing environment as described herein (e.g., computing environment 200 of FIG. 2 and/or FIG. 3). For example, the scanner server 105 may include a processing unit 202, a memory unit 204, an input/output (I/O) unit 206, and/or a communication unit 208. Each of the processing unit 202, the memory unit 204, the input/output (I/O) unit 206, and/or the communication unit 208 may include one or more subunits and/or other computing instances as described herein for performing operations associated with a malware detection framework. A network administrator (e.g., a user) may operate the scanner server 105 either locally or remotely.

In some embodiments, the target endpoint device 125 may include a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a video communications server. In some embodiments, the target endpoint device 125 may include a plurality of computing devices configured to communicate with one another and/or implement load-balancing techniques described herein.

The target endpoint device 125 may include various elements of a computing environment as described herein (e.g., computing environment 200 of FIG. 2 and/or FIG. 3). For example, the target endpoint device 125 may include a processing unit 202, a memory unit 204, an input/output (I/O) unit 206, and/or a communication unit 208. Each of the processing unit 202, the memory unit 204, the input/output (I/O) unit 206, and/or the communication unit 208 may include one or more subunits and/or other computing instances as described herein for performing operations associated with a malware detection framework. A network administrator (e.g., a user) may operate the target endpoint device 125 either locally or remotely.

The scanner server 105 may be connected to the network 110 via conventional communications means. For example, the scanner server 105 may include a web server 115 to provide an interface to the network 110. The scanner server 105 may also include a scanner engine 120. The scanner engine 120 may include scanning software and/or hardware used to conduct scans of the target endpoint device(s) 125. For example, if the system 100 is to be employed to access and scan a security posture of the target endpoint device 125 (e.g., to detect malware running and/or installed on the target endpoint device 125), the scanner engine 120 may include signature data 130 of viruses, worms, and/or the like for conducting such security assessments. In some embodiments, the scanner engine may also include a malware detection framework 119 that is used to detect variants of malware families as described herein. For example, the framework 119 may be used to detect attributes and/or threat behaviors associated with the target endpoint device 125 to determine whether to the target endpoint device 125 known or unknown variants of particular malware families. In some embodiments, the signature data 130 may be included in one or more nodes of the framework 119. Additionally, the scanner engine may determine that certain patches may be needed on the endpoint device 125 to address vulnerability issues detected from the assessment based on the scan(s).

In order to implement a malware detection scan in accordance with the disclosed principles, an agent proxy 135 may be included in the scanner server 105. The agent proxy 135 may be used to initiate a remote agent-based scan at the endpoint device 125. Additionally, the agent proxy 135 may establish a communication connection between the scanner engine 120 and the agent or thin-client on the target endpoint device 125 (e.g., scanner client 140) via a web server 115. As a result, the remote scanner engine 120 causes the scanner client 140 to conduct a local scan of the endpoint device 125. The scanner engine 120 may be controlled by a user at the endpoint device 125 by way of a web browser 155 of the endpoint device in communication with the web server 115 of the scanner server 105. For example, the web browser 155 of the target endpoint device 125 may be used to access a web application 165 of the web server 115 of the scanner server 105. The web application 165 may then initiate remote scans and/or malware detection processes on the endpoint device 125 using an agent that is stored at the scanner server 105.

The web server 115 may include a secure socket layer (SSL) proxy server 145 for establishing a secure HTTP-based connectivity 150 between the scanner client 140 and the agent proxy 135. Other forms of secure connection techniques, such as encryption, may be employed across the network 110. In some embodiments, the scanner client 140 may be installed on the endpoint device 125. In other embodiments, the scanner client 140 may simply be accessed by the endpoint device 125 using one or more techniques described herein.

The web server 115 of the scanner server 105 may deliver artifacts (e.g., binary code, instructions, the framework 119 and/or signature data 130) to the agent scanner client 140 of the endpoint device 125 across the open network 110 via the web browser 155 running on the endpoint device 125. More specifically, web and agent resources 160 may be provided to the endpoint device 125 via a web application 165 on the web server 115. These resources 160 may be used to render a web-based graphical user interface (GUI) 170 via the web browser 155 running on the endpoint device 125. Moreover, the web server 115 may run code for generating scan reports of the endpoint device 125 based on the agent resources 160. The scanner client 140 may conduct scans and transmit collected scan data back to the agent proxy 135 via a communications link provided by the web server 115. The agent proxy 130 and/or the scanner engine 120 (and/or another element described herein) may process the received scan data generated by the scanner engine 120. A tunnel 137 may also be provided in the scanner server 105 to act as a bi-directional communication channel between the scanner client 140 and the scanner engine 120.

Turning back to the client-side endpoint device 125, the web browser 155 may comprise a plug-in 175 that is used to establish the connection from the scanner client 140 back to the scanner engine 120, where the agent proxy 135 may process the results of the scan(s). In an exemplary embodiment, the scanner client 140 may employ a QODA protocol exchange with the scanner engine 120 in order to conduct the desired scan(s) as well as to provide the results of such scan(s) back to the scanner engine 120. In some embodiments, the QODA protocol is a TCP-based binary protocol which enables a connection between the scanner engine 120 and the scanner client 140 utilizing a flow control scheme. In other embodiments, similar protocols to QODA may be employed between the scanner client 140 and scanner engine 120. Additionally, the plug-in 175 of the web browser 155 may be utilized to conduct scans of the endpoint device 125.

During the scan(s), the scanner client 140 may access an operating system 180 of the endpoint device 125. Once obtaining access, the scanner client 140 may then scan a security posture (e.g., perform malware detection and/or another appropriate scan conducted in accordance with the implementation of the disclosed principles) of the endpoint device 125 by scanning a system configuration 185, a file system 190, and/or system services 195 associated with the endpoint device 125. The scanner client 140 may also scan one or more application files associated with applications running on the endpoint device 125. As mentioned above, results of the scan(s) (e.g., scan data) may be communicated from the scanner client 140 back to the scanner server 105 for processing of the results. The browser-based plug-in 175 may then provide any needed downloads detected during the scan(s) such as updates to the framework 119, the signature data 130, and/or other elements of scanner server 105. In addition, the plug-in 175 may also provide automatic updates to the agent scanner client 140 as provided from the agent resources 160 in order to ensure the scanner client 140 is up-to-date on the latest malware detection framework 119 and/or signature data 130 needed for conducting appropriate scans of the endpoint device 125. In some embodiments, the framework 119 may be updated based on received scan data.

In some embodiments, the scanner server 105 may further comprise a sandbox 117 (e.g., a secure environment in which various computing processes may be executed). For example, the sandbox 117 may be used to execute data samples (e.g., files, programs, and/or the like) known to be associated with malware in a secure way so as to not expose the scanner server 105 and/or the endpoint device 125 to malware. As used herein, malware may include a threat, vulnerability, a virus, and/or other potentially harmful attributes. As used herein, a malware variant may be a variation and/or version of a known malware family. For example, a first malware variant of a particular malware family may share threat behaviors, signatures, and/or other identifying attributes with a second (or multiple other) malware variants of the malware family. As used herein, a malware family may include various malwares which share common attributes.

Particularly, malware and malware variants may be executed in the sandbox 117 of the scanner server 105 for the purpose of training the framework 119. Training the framework 119 may include determining which attributes of a malware family and/or a malware variant of the malware family are indicative of the malware family and/or the malware variant. By distinguishing between known identifiers and known non-identifiers (e.g., specific signatures), strong indicators (e.g., core indicators), moderate indicators, and weak indicators of the malware family and/or malware variant, the framework 119 may be constructed to detect and accurately identify malware on the endpoint device 125 during scans.

In some embodiments, the scan data received during scans may be processed in the sandbox 117. The processing of received scan data may occur remotely in relation to the endpoint device 125, one or more components of the scanner server 105, and/or the like so that no element of the system 100 is undesirably affected by malware.

As described in more detail below, received scan data that is known to be associated with malware may be executed and parsed in the sandbox 117 for the purpose of determining which attributes identified in the scan data are useful for identifying the malware, as well as to what extent the identified attributes are indicative of the malware. Information gleaned from malware executed in the sandbox 117 may be aggregated and added to one or more nodes of the framework 119. The framework 119 may then be deployed to determine whether scan data associated with the endpoint device 125 (and/or other endpoint devices 125) is associated with known malware variants and/or includes attributes that are indicative of known malware variants and/or new malware variants of known malware families.

Computing Architecture

FIG. 2 and FIG. 3 illustrate exemplary functional and system diagrams of a computing environment 200 for performing operations described herein. Specifically, FIG. 2 provides a functional block diagram of the computing environment 200, whereas FIG. 3 provides a detailed system diagram of the computing environment 200.

As seen in FIG. 2 and FIG. 3, the computing environment 200 may include a processing unit 202, a memory unit 204, an I/O unit 206, and a communication unit 208. Each of the processing unit 202, the memory unit 204, the I/O unit 206, and the communication unit 208 may include one or more subunits for performing operations associated with framework generation as described herein. Further, each unit and/or subunit of the computing environment 200 may be operatively and/or otherwise communicatively coupled with each other so as to facilitate the framework generation described herein. The computing environment 200 including any of its units and/or subunits may include general hardware, specifically-purposed hardware, and/or software.

Importantly, the computing environment 200 and any units and/or subunits of FIG. 2 and/or FIG. 3 may be included in one or more elements of system 100 as described by FIG. 1. For example, one or more elements (e.g., units and/or subunits) of the computing environment 200 may be included in the scanner server 105 and/or the endpoint device 125.

The processing unit 202 may control one or more of the memory unit 204, the I/O unit 206, and the communication unit 208 of the computing environment 200, as well as any included subunits, elements, components, devices, and/or functions performed by the memory unit 204, the I/O unit 206, and the communication unit 208. The described subelements of the computing environment may also be included in similar fashion in any of the other units and/or devices included in the system 100 of FIG. 1. Additionally, any actions described herein as being performed by a processor may be taken by the processing unit 202 of FIG. 2 and/or FIG. 3 alone and/or by the processing unit 202 in conjunction with one or more additional processors, units, subunits, elements, components, devices, and/or the like. Additionally, while one processing unit 202 may be shown in FIG. 2 and/or FIG. 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits and/or elements of the aforementioned units, other devices and/or computing environments, and/or the like.

In some embodiments, the processing unit 202 may include, among other elements, subunits such as a profile management unit 210, a content management unit 212, a location determination unit 214, a graphical processing unit (GPU) 216, a resource allocation unit 218, an attribute processing unit 220, a threat detection unit 222, and/or an Indicators of Compromise (IOC) creation unit 224. Each of the aforementioned subunits of the processing unit 202 may be communicatively and/or otherwise operably coupled with each other.

The profile management unit 210 may facilitate generation, modification, analysis, transmission, and/or presentation of a user profile of a user, a device profile of a device (e.g., the scanner server 105 and/or the endpoint device 125), and/or a malware profile associated with a malware family and/or variant. The profile management unit 210 may receive, process, analyze, organize, and/or otherwise transform any data so as to generate a profile.

The content management unit 212 may facilitate generation, modification, analysis, transmission, and/or presentation of content. Content may be file content, or media content, or malware content, or any combination thereof. For example, the content management unit 212 may control the audio-visual environment and/or appearance of application data during execution of various processes (e.g., via web GUI 170 at the endpoint device 125). Content for which the content management unit 212 may be responsible may include device information, user interfaces, images, text, themes, audio files, video files, documents, and/or the like. In some embodiments, the content management unit 212 may also interface with a third-party content server and/or memory location.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determination unit 214 may include various sensors, a radar, and/or other specifically-purposed hardware elements for the location determination unit 214 to acquire, measure, and/or otherwise transform location information.

The GPU unit 216 may facilitate generation, modification, analysis, processing, transmission, and/or presentation of content described above, as well as any data (e.g., scanning instructions, the framework 119, scan data, and/or the like) described herein. In some embodiments, the GPU unit 216 may be utilized to render content for presentation on a computing device (e.g., via web GUI 170 at the endpoint device 125). The GPU unit 216 may also include multiple GPUs and therefore may be configured to perform and/or execute multiple processes in parallel. In some embodiments, GPU unit 216 may be used in conjunction with attribute processing unit 220, threat detection unit 222, IOC creation unit 224, and/or any combination thereof.

The resource allocation unit 218 may facilitate the determination, monitoring, analysis, and/or allocation of computing resources throughout the computing environment 200 and/or other computing environments. For example, the computing environment may facilitate a high volume of data (e.g., files, malware variants) to be processed and analyzed. As such, computing resources of the computing environment 200 utilized by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may be configured to manage the allocation of various computing resources as they are required by particular units and/or subunits of the computing environment 200 and/or other computing environments. In some embodiments, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may utilize computing resources of a second computing environment separate and distinct from the computing environment 200 to facilitate a desired operation.

For example, the resource allocation unit 218 may determine a number of simultaneous computing processes and/or requests. The resource allocation unit 218 may then determine that the number of simultaneous computing processes and/or requests meets and/or exceeds a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

In some embodiments, factors affecting the allocation of computing resources by the resource allocation unit 218 may include the number of r computing processes and/or requests, a duration of time during which computing resources are required by one or more elements of the computing environment 200, and/or the like. In some embodiments, computing resources may be allocated to and/or distributed amongst a plurality of second computing environments included in the computing environment 200 based on one or more factors mentioned above. In some embodiments, the allocation of computing resources of the resource allocation unit 218 may include the resource allocation unit 218 flipping a switch, adjusting processing power, adjusting memory size, partitioning a memory element, transmitting data, controlling one or more input and/or output devices, modifying various communication protocols, and/or the like. In some embodiments, the resource allocation unit 218 may facilitate utilization of parallel processing techniques such as dedicating a plurality of GPUs included in the processing unit 202 for running a multitude of processes.

The attribute processing unit 220 may facilitate the retrieval, analysis, and/or processing of data for the purpose of identifying attributes associated with the endpoint device 125 and/or determining whether identified attributes are indicative of a malware variant and/or malware family. For example, during a scan of the endpoint device 125, the attribute processing unit 220 may utilize the framework 119 to determine whether attributes identified in received scan data are indicative of a known malware family and/or malware variant. As another example, during construction of the framework 119, the attribute processing unit 220 may identify an attribute in a data sample known to be associated with a malware family, determine an attribute type of the attribute, count a number of occurrences of the attribute in the file sample, assign a weight to the identified attributes based on at least one of the attribute type and the determined number of occurrences, and then add the attribute to a node of the framework 119 based on determining whether the attribute is indicative of the malware family.

The attribute processing unit 220 may receive, process, analyze, organize, classify, and/or otherwise transform any data (e.g., scan data, a malware file, and/or the like) received from another computing element so as to generate a list of attributes and/or weights of attributes based on how useful they are in identifying malware. In some embodiments, attribute processing unit 220 may facilitate counting occurrences of an attribute in a data sample and/or scan data. The attribute processing unit 220 may also facilitate calculation of an occurrence score and/or a weigh for an attribute. According to some embodiments, attribute processing unit 220 may facilitate generating a database of attributes and/or a node of the framework 119. A database, in some embodiments, may include a database listing attributes, occurrence scores for attributes, weights of attributes, and/or the like. In some embodiments, attribute processing unit 220 may classify attributes. Weights, according to some embodiments, may be assigned based on an occurrence score, and/or a classification type, and/or the like. In some embodiments, thresholds may be applied by the attribute processing unit 220 to an occurrence score, a weight, an attribute, a framework node, and/or the like, where the threshold is used to determine a classification of an attribute. In some embodiments, attribute processing unit 220 may be operable to control the framework 119 for detecting malware.

The threat detection unit 222 may facilitate scanning of the endpoint device 125 for determining a security posture and/or detecting malware. The detection of malware at the endpoint device 125 may be based on the framework 119, the signature data 130, and/or other rules established and used for scanning the endpoint device 125.

The IOC creation unit 224 may facilitate creation of the framework 119 that is used to scan the endpoint device 125. The IOC creation unit 224 may work in conjunction with the attribute processing unit 220 to generate lists of attributes in each node of the framework 119. For example, the framework 119 may include four nodes: (1) a first node including a list of attributes that are known identifiers of malware variants of a malware family; (2) a second node including a list of attributes that have been determined to be strong indicators of malware variants of a malware family; (3) a third node including a list of attributes that have been determined to be average indicators of malware variants of a malware family; and (4) a fourth node including a list of attributes that have been determined to be weak indicators of malware variants of a malware family. The framework 119 may also include a node associated with attributes classified as known non-identifiers (e.g., attributes that indicate a data sample is not associated with malware). The IOC creation unit 224 may control assignment of identified and/or classified attributes to the one or more nodes of the framework 119.

In some embodiments, the memory unit 204 may be utilized for storing, recalling, receiving, transmitting, and/or accessing various files and/or data (e.g., malware files, malware samples, scan data, and/or the like) during operation of computing environment 200. For example, memory unit 204 may be utilized for storing, recalling, and/or updating profile information, scan history information, and/or the like. Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. For example, memory unit 204 may include various subunits such as an operating system unit 226, an application data unit 228, an application programming interface (API) unit 230, a profile storage unit 232, a content storage unit 234, a scan history unit 236, a secure enclave 238, and/or a cache storage unit 240.

The memory unit 204 and/or any of its subunits described herein may include random access memory (RAM), read only memory (ROM), and/or various forms of secondary storage. RAM may be used to store volatile data and/or to store instructions that may be executed by processing unit 202. For example, the data stored may be a command, a current operating state of computing environment 200, an intended operating state of computing environment 200, and/or the like. As a further example, data stored in memory unit 204 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, memory unit 204 may include one or more databases for storing any data described herein. Additionally or alternatively, one or more secondary databases located remotely from computing environment 200 may be utilized and/or accessed by memory unit 204. In some embodiments, memory unit 204 and/or its subunits may be local to the scanner server 105 and/or the endpoint device 125 and/or remotely located in relation to the scanner server 105 and/or the endpoint device 125.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application utilized by computing environment 200 and/or any other computing environment described herein. For example, the endpoint device 125 may be required to download, install, access, and/or otherwise utilize a software application (e.g., web application 165) to facilitate performance of malware scanning operations and/or framework generation as described herein. As such, application data unit 228 may store any information and/or data associated with the application. Application data unit 228 may further store various pieces of information and/or data associated with operation of the application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The application programming interface (API) unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the scanner server 105 and the endpoint device 125 to communicate with each other.

The profile storage unit 232 may facilitate deployment, storage, access, and/or utilization of information associated with profiles of devices and/or users as described herein. For example, profile storage unit 232 may store contact information, personal information, payment information, authentication credentials, preferences, a history of behavior, location information, infection information, attribute information, scan data, and/or scan request information associated with the endpoint device 125, the scanner server 105, and/or a user of the same. In some embodiments, profile storage unit 232 may communicate with profile management unit 210 to receive and/or transmit information associated with a profile.

The content storage unit 234 may facilitate deployment, storage, access, and/or utilization of information associated with performance of malware scanning operations and/or framework processes by computing environment 200 and/or any other computing environment described herein. In some embodiments, content storage unit 234 may communicate with content management unit 212 to receive and/or transmit content files (e.g., media content) such as the web GUI 170.

The scan history unit 236 may facilitate deployment, storage, access, analysis, and/or utilization of scan data received during a scan of the endpoint device 125. For example, scan history unit 236 may store information associated with each operation that involves file scanning, malware file execution, and/or malware detection. Information stored in scan history unit 236 may be utilized by profile management unit 210, content management unit 212, GPU unit 216, attribute processing unit 220, threat detection unit 222, and/or the IOC creation unit 224 to perform malware scanning operations and/or framework processes as described herein.

The secure enclave 238 may facilitate secure storage of data. In some embodiments, secure enclave 238 may include a partitioned portion of storage media included in memory unit 204 that is protected by various security measures. For example, secure enclave 238 may be hardware secured. In other embodiments, secure enclave 238 may include one or more firewalls, encryption mechanisms, and/or other security-based protocols. Authentication credentials of a user may be required prior to providing the user access to data stored within secure enclave 238. In some embodiments, the secure enclave 238 may include the sandbox 117, and/or vice versa.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some embodiments, cache storage unit 240 may include RAM and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing malware scanning operations and/or framework processes as described herein. For example, elements of the I/O unit 206 may be used to receive input from a user of the endpoint device 125. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with malware scanning operations and/or framework processes as described herein.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently.

In some embodiments, I/O calibration unit 244 may utilize a driver 246 (or multiple drivers) to calibrate I/O device 242. For example, driver 246 may include software that is to be installed by I/O calibration unit 244 so that an element of computing environment 200 (or an element of another computing environment) may recognize and/or integrate with I/O device 242 for the malware scanning operations and/or framework processes described herein.

The communication unit 208 may facilitate establishment, maintenance, monitoring, and/or termination of communications between computing environment 200 and other computing environments, third party server systems, and/or the like (e.g., between the scanner server 105 and the endpoint device 125). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. The communication unit 208 may include hardware and/or software elements.

The network protocol unit 248 may facilitate establishment, maintenance, and/or termination of a communication connection for computing environment 200 by way of a network. For example, network protocol unit 248 may detect and/or define a communication protocol required by a particular network and/or network type. Communication protocols utilized by network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing malware scanning operations and/or framework processes as described herein.

The application programming interface (API) gateway 250 may facilitate other devices and/or computing environments to access API unit 230 of memory unit 204 of computing environment 200. For example, an endpoint device may access API unit 230 of computing environment 200 via API gateway 250. In some embodiments, API gateway 250 may be required to validate user credentials associated with a user of an endpoint device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Malware Detection

Figure 4:
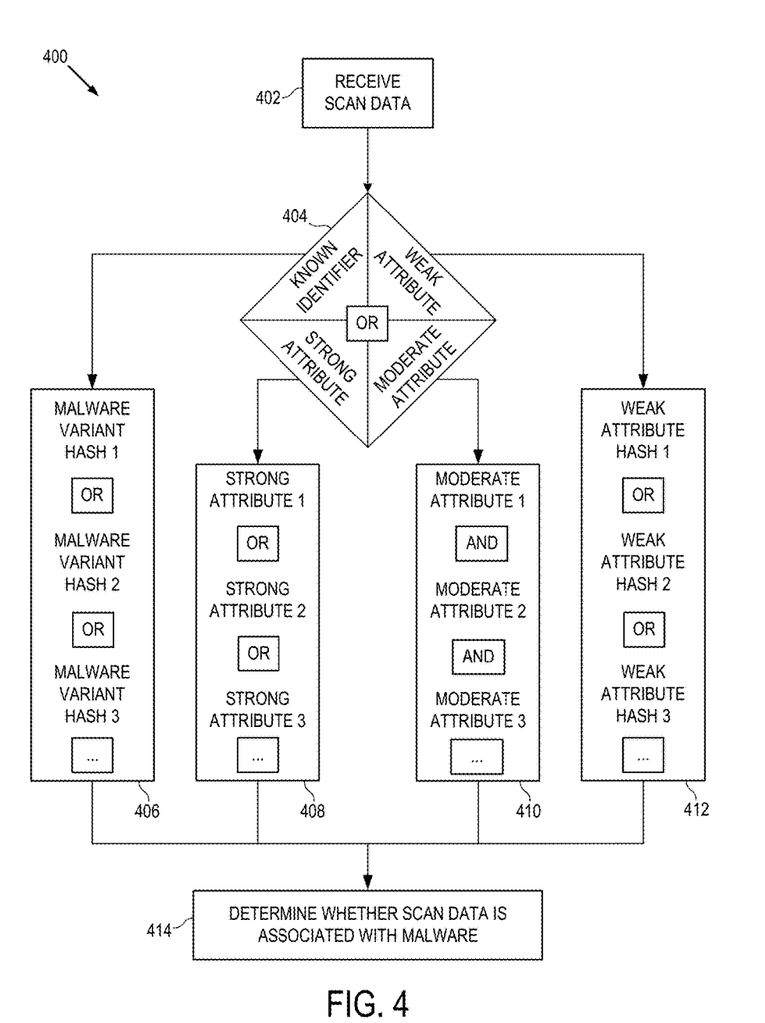
FIG. 4 illustrates an exemplary method for detecting malware using a framework in accordance with some embodiments of the disclosure.

FIG. 4 illustrates an exemplary method 400 for detecting malware using a framework (e.g., framework 119) in accordance with some embodiments of the disclosure. At block 402, scan data is received by the scanner server 105. In some embodiments, the scan data may be received in response to conducting a scan of the endpoint device 125. For example, a web-based scanning agent (e.g., scanning client 140) may collect various pieces of information associated with the endpoint device 125.

The received scan data may be made accessible to various processing units of the scanner server 105 including the scanner engine 120. The received scan data may also be stored in one or more memory locations associated with the scanner server 105, including a secure location (e.g., sandbox 117).

At block 404, various elements of the scanner server 105 may process the received scan data at a secure location remote from the endpoint device 125. The scanner server 105 may parse the scan data for the purpose of identifying one or more attributes known to be associated with malware in the scan data. To identify one or more attributes in the scan data, the scanner server 105 may utilize a framework (e.g., framework 119).

In some embodiments, the framework may include four nodes: (1) a first node 406 including a list of attributes that are known identifiers of malware variants of a malware family; (2) a second node 408 including a list of attributes that have been determined to be strong indicators of malware variants of a malware family; (3) a third node 410 including a list of attributes that have been determined to be average indicators of malware variants of a malware family; and (4) a fourth node 412 including a list of attributes that have been determined to be weak indicators of malware variants of a malware family. The framework may also include a node associated with attributes classified as known non-identifiers (e.g., attributes that indicate a data sample is not associated with malware).

Using the framework, the scanner server 105 may compare portions of the scan data to the list of attributes (and/or identifiers such as hashed identifiers associated with known attributes) included in the nodes 406, 408, 410, 412. The scanner server 105 may compare portions of scan data to the nodes 406, 408, 410, 412 in any order.

Based on comparisons, the scanner server 105 may determine that a match exists between portions of scan data and lists of known attributes of one or more nodes 406, 408, 410, 412. Depending on the node of the framework to which the matching attribute is assigned, the portion of the scan data may be determined to be: (a) associated with malware; (b) potentially associated with malware; and/or not (c) associated with malware. This process is explained below in more detail with reference to block 414.

For example, the first node 406 may include a list of known attributes and/or known identifiers of a particular malware family and/or malware variant (e.g., a blacklist). As such, if the scanner server 105 determines a match between a portion of scan data and a known identifier of a particular malware family, then the scanner server 105 may determine that the portion of the scan data is associated with the malware family. Thus, the scanner server 105 may determine, with high confidence, that the endpoint device 125 is potentially exposed to the malware family.

Additionally, the first node 406 (and/or another node) may also include a list of attributes and/or identifiers known to not be associated with any malware family and/or malware variant (e.g., a whitelist). As such, if the scanner server 105 determines a match between a portion of scan data and a known non-identifier of malware, then the scanner server 105 may determine that the portion of the scan data is not associated with the malware family, and may move on to processing a next portion of the scan data. Depending on whether there are additional portions of scan data to process, the scanner server 105 may also determine, with high confidence, that the endpoint device 125 is not exposed to the malware family.

As another example, the second node 408 may include a list of attributes and/or identifiers known to be strong indicators of a particular malware family and/or malware variant. As such, if the scanner server 105 determines a match between a portion of scan data and a strong indicator of a particular malware family, then the scanner server 105 may determine that the portion of the scan data is associated with the malware family. Thus, the scanner server 105 may determine, with high confidence, that the endpoint device 125 is potentially exposed to the malware family.

As another example, the third node 410 may include a list of attributes and/or identifiers known to be average indicators of a particular malware family and/or malware variant. As such, if the scanner server 105 determines a match between a portion of scan data and an average indicator of a particular malware family, then the scanner server 105 may determine that the portion of the scan data is associated with the malware family. In some embodiments, the scanner server 105 may be required to identify a match between the scan data and a plurality of average indicators included in the third node 410 of the framework in order to determine that the portion of the scan data is associated with the malware family. For example, the scanner server 105 may identify a match between a portion of scan data and a plurality of attributes in a grouping of attributes, where each attribute of the grouping of attributes is an average indicator of malware, but when grouped together, the attributes collectively serve as a strong indicator of malware. In some embodiments, the plurality of attributes must exceed a predetermined threshold value. Thus, the scanner server 105 may determine, with high confidence, that the endpoint device 125 is potentially exposed to the malware family.

As another example, the third node 412 may include a list of attributes and/or identifiers known to be weak indicators of a particular malware family and/or malware variant. As such, if the scanner server 105 determines a match between a portion of scan data and a weak indicator of a particular malware family, then the scanner server 105 may not determine that the portion of the scan data is associated with the malware family and may move on to processing a next portion of the scan data.

Additional factors that may affect the determination of whether portions of scan data are associated with and/or indicative of malware as discussed at block 414 include a counted number of times an attribute is identified in the scan data (and/or a portion of scan data), an attribute type of an identified attribute, and/or a time, date, and/or location associated with an identified attribute and/or scan data. The scanner server 105 is enabled to perform attribute type determinations, counts of occurrences of attributes in scan data, and/or other processing associated with attributes to ensure that malware is accurately detected.

After the scanner server 105 determines whether the scan data is indicative of malware, the scanner server 105 may facilitate the generation of a report indicating whether the endpoint device 125 is exposed to risks associated with malware. The report may include a listing of identified attributes, a count of identified attributes, a type of each identified attribute, an identification of each malware family and/or malware variant determined to be associated with the endpoint device 125, and/or one or more recommendations for addressing the vulnerabilities.

Framework Generation

Figure 5:
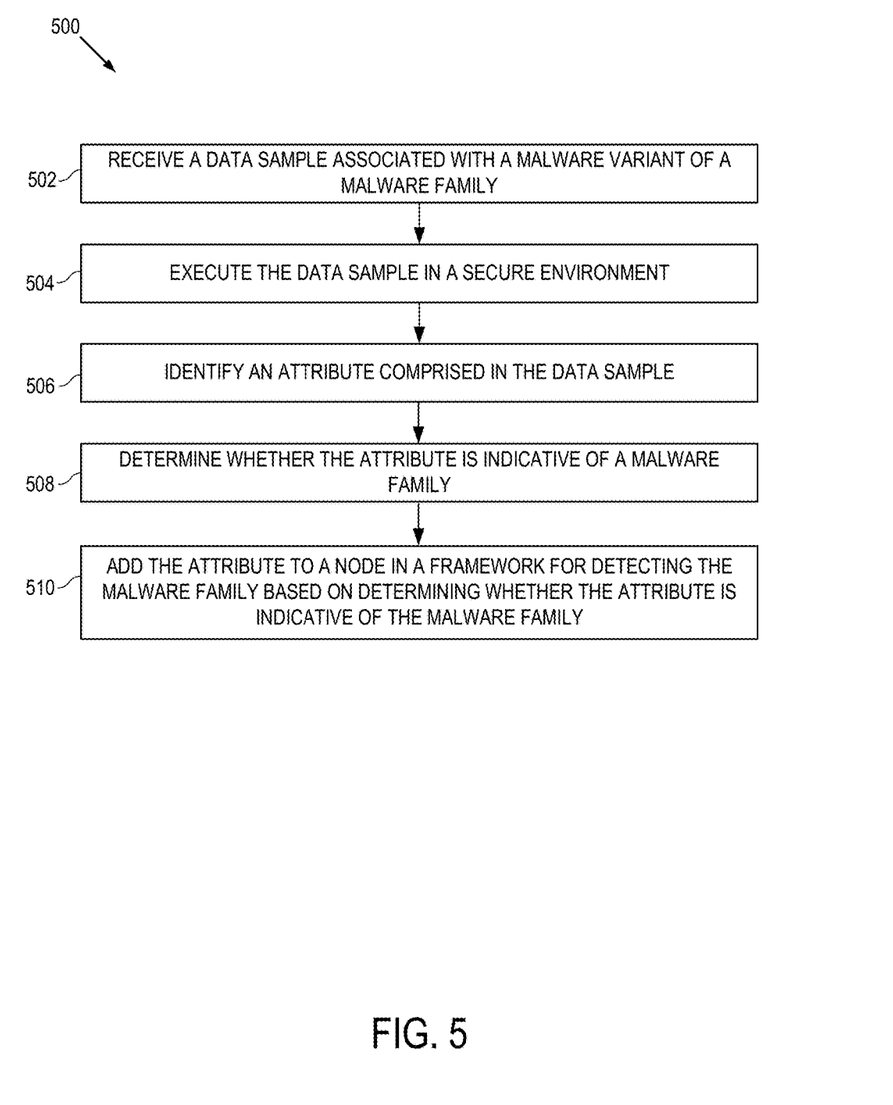
FIG. 5 shows an exemplary process flow for generating a malware detection framework in accordance with some embodiments of the disclosure.

FIG. 5 shows an exemplary method 500 for generating a malware detection framework (e.g., the framework 119). As described with reference to FIG. 4, a malware detection framework may be used to scan the endpoint device 125 for vulnerabilities related to known malware families. The framework described herein may advantageously be used to identify unknown variants of malware families based on identifying attributes (e.g., threat behaviors) that are common amongst members of a particular malware family.

In order for the framework to be able to identify unknown variants of malware families, the framework may go through one or more machine learning and/or "training" processes. These training processes may include determining which attributes associated with a malware family are indicative of the malware family and thus variants of the malware family. Attributes are then aggregated into various nodes of the framework based on how indicative of the malware family they are.

At block 502, the scanner server 105 may receive and/or retrieve a data sample known to be associated with a malware family. The data sample may include a malware file, a file known to be infected with a particular malware variant of the malware family, scan data, and/or other information. In some embodiments, the data sample may be associated with a plurality (e.g., a large number) of variants of a malware family. The data sample may be received in response to conducting a scan of the endpoint device 125 and/or may be retrieved from a memory location. In some embodiments, processing of the data sample may be performed by a computing device separate from the scanner server 105 (e.g., a backend cloud computing device).

At block 504, the scanner server 105 may execute the data sample in a secure environment. By executing the data sample in the secure environment, elements of the scanner server 105 and/or the endpoint device 125 may be shielded from potentially harmful artifacts (e.g., malware) associated with the data sample. In some embodiments, executing the data sample may include generating the secure environment. The secure environment may be generated by the scanner server 105 based on one or more characteristics of the data sample such as a size, a file type, a malware type, computing resource requirements, and/or the like. The secure environment may be local to the scanner server 105 and/or remote to the scanner server 105.

Executing the data sample may enable the scanner server 105 to observe and/or determine how the data sample (and thus the malware variant) behaves. For example, executing the data sample may cause the data sample to establish one or more file properties, dynamic attributes (e.g., registry modifications and/or file system changes), domain name server (DNS) requests, active and/or previous transmission control protocol (TCP) and/or Internet Protocol (IP) connections, serial numbers of hardware, identification numbers associated with malware and/or other software, a duration of time associated with operation of one or more processes, a runtime status of one or more processes and/or applications, and/or any combination thereof.

As indicated at block 506, each behavior exhibited by the data sample may be identified and/or labeled by the scanner server 105 as an attribute. It is noted that one or more of these attributes may be indicative of behavior commonly exhibited by members and/or variants of the malware family. For example, each variant of a malware family may attempt to connect to a particular IP address for the purpose of downloading a virus onto its host computing device. As such, the scanner server 105 may use the framework to scan the endpoint device 125 for connections to that particular IP address, and if discovered, may determine that the endpoint device 125 is indeed potentially exposed to vulnerabilities associated with that malware family.

As discussed with reference to block 508, the scanner server 105 may determine whether an attribute identified in the data sample is indicative of the malware family. To do so, the scanner server 105 may determine an attribute type for the attribute. The attribute types may include one or more file properties, dynamic attributes (e.g., registry modifications and/or file system changes), domain name server (DNS) requests, active and/or previous transmission control protocol (TCP) and/or Internet Protocol (IP) connections, serial numbers of hardware, identification numbers associated with malware and/or other software, a duration of time associated with operation of one or more processes, a runtime status of one or more processes and/or applications, and/or any combination thereof.

Additionally, the scanner server 105 may determine an occurrence score (e.g., occurrence) for the attribute. Determining the occurrence score for the attribute may include counting a number of times the attribute occurs in the data sample. By counting the number of occurrences, the scanner server 105 may identify whether the attribute occurs frequently in the data sample and/or infrequently in the data sample. In some embodiments, the scanner server 105 may compare the occurrence score to a threshold value for filtering as described in more detail below.

Next, the scanner server 105 may assign a weight to the identified attribute. In some embodiments, the weight may correspond to a likelihood that the attribute identifies and/or is indicative of the malware family. For example, the weight may indicate how well an identified attribute matches behavior common amongst variants of a malware family. The weight may be a numerical value, a percentage, a score, a grade, and/or another value.

The weight may be assigned to the attribute based on the determined attribute type and/or the occurrence score of the attribute. The weight may also be assigned to the attribute by cross-referencing a user-configurable matrix in which attribute weights are defined for various attribute types and/or occurrence scores of the same.

For example, a first weight assigned to a first attribute with a higher occurrence score may be larger than a second weight assigned to a second attribute with a lower occurrence score. As another example, a first weight of a first attribute of a first attribute type may be larger than a second weight of a second attribute of a second type. Additionally, the weight may be based on both the attribute type and the occurrence score.

Additionally, if the scanner server 105 identifies a plurality of attributes in the data sample, the scanner server 105 may filter one or more attributes from the plurality of attributes. Attributes may be filtered based on an attribute type, an occurrence score, and/or a weight. For example, an attribute of a particular attribute type may be filtered out of a group of attributes. As another example, an attribute with an occurrence score below a predetermined threshold value may be filtered out of a group of attributes. As another example, an attribute with a weight below a predetermined threshold value may be filtered out of a group of attributes. In this manner, filtering attributes may enable the scanner server 105 to eliminate "noise" associated attributes that are not indicative of malware so that the scanner server 105 may focus on processing more relevant attributes.

As discussed with reference to block 510, the scanner server 105 may add the identified attribute to a node of the malware detection framework. In some embodiments, the attribute may be added to a node of the framework based on how indicative of the malware family the attribute is determined to be. The scanner server 105 may use one or more of a calculated weight, a calculated occurrence score, and an attribute type of an attribute to determine how indicative of the malware family the attribute is.

In some embodiments, determining how indicative of a malware family an attribute is may include classifying the attribute as a weak indicator, an average indicator, a strong indicator, or a known identifier. The attribute may also be classified as a known non-identifier. The attribute may be classified based on one or more of a calculated weight, a calculated occurrence score, and an attribute type of the attribute.

Classification of identified attributes may include comparing occurrence scores of identified attributes and/or weights of an attribute to one or more threshold values associated with each classification.

The scanner server 105 may then add the attribute to a node of the malware detection framework based on the classification of the attribute. As described above, one or more nodes of the malware detection framework may be associated with each of weak indicators, average indicators, strong indicators, and/or known identifiers (as well as known non-identifiers). For example: (1) a first node of the malware detection framework may be associated with attributes classified as known identifiers of malware variants of a malware family; (2) a second node of the malware detection framework may be associated with attributes classified as strong indicators of malware variants of a malware family; (3) a third node of the malware detection framework may be associated with attributes classified as average indicators of malware variants of a malware family; and (4) a fourth node a second node of the malware detection framework may be associated with attributes classified as weak indicators of malware variants of a malware family. Additionally, a fifth node of the malware detection framework may be associated with attributes classified as known non-identifiers of malware variants of a malware family.

In this manner, the scanner server 105 may add the attribute to the node of the framework that corresponds to the classification of the attribute. For example, an attribute that is determined to be a known identifier of malware may be added to the first node (e.g., a node associated with known identifiers of a particular malware variant and/or malware family). As another example, an attribute that is determined to be a strong indicator of malware may be added to the second node (e.g., a node associated with strong indicators of a particular malware variant and/or malware family). As another example, an attribute that is determined to be an average indicator of malware may be added to the third node (e.g., a node associated with average indicators of a particular malware variant and/or malware family). As another example, an attribute that is determined to be a weak indicator of malware may be added to the fourth node (e.g., a node associated with weak indicators of a particular malware variant and/or malware family). As another example, an attribute that is determined to be a known non-identifier of malware may be added to the fifth node (e.g., a node associated with known non-identifiers of a particular malware variant and/or malware family).

In some embodiments, the scanner server 105 may add the attribute to the node simply by adding the attribute to a list (e.g., a table, a database, and/or the like) of attributes associated with the node. Alternatively, the scanner server 105 may add the attribute to the node of the malware detection framework as a hashed value. For example, the scanner server 105 may generate a hashed value for a known identifier and/or a known non-identifier of a malware variant, a malware family, and/or a malware sample. A hashed value of an entire malware sample may also be generated. Additionally, a hashed value of an attribute may be generated. The scanner server 105 may then add the hashed value to a list of hashed values associated with a corresponding node of the malware detection framework.

Depending on the classification of the attribute, the attribute may be added to the corresponding node using one or more Boolean logic operators, namely "OR" operators and/or "AND" operators. For example, a known identifier may be added to a corresponding node (e.g., the first node) of the malware detection framework using an "OR" operator. In this manner, during scans of the endpoint device 125, the scanner server 105 and/or an agent (e.g., scanner client 140) may determine whether a portion of scan data associated with the endpoint device 125 matches a first known identifier OR a second known identifier OR a third known identifier, and so on. Because known identifiers are known to be indicative of malware, as soon as a portion of the scan data is determined to match one of the known identifiers, the scanner server 105 may determine that the portion of scan data, and thus the endpoint device 125, is infected with malware.

Similarly, attributes classified as strong attributes may be added to the second node of the framework using "OR" operators. Again, during scans of the endpoint device 125, the scanner server 105 and/or an agent (e.g., scanner client 140) may determine whether a portion of scan data associated with the endpoint device 125 matches a first strong indicator OR a second strong indicator OR a third strong indicator, and so on. Because strong indicators are known to be highly correlated with malware, as soon as a portion of the scan data is determined to match one of the strong indicators, the scanner server 105 may determine that the portion of scan data, and thus the endpoint device 125, is likely infected with malware.

Similarly, a known non-identifier may be added to a corresponding node (e.g., the first node, the fourth node, and/or the fifth node) of the malware detection framework using an "OR" operator. In this manner, during scans of the endpoint device 125, the scanner server 105 and/or an agent (e.g., scanner client 140) may determine whether a portion of scan data associated with the endpoint device 125 matches a first known non-identifier OR a second known non-identifier OR a third known non-identifier, and so on. Because known non-identifiers are known to not be indicative of malware, as soon as a portion of the scan data is determined to match one of the known non-identifiers, the scanner server 105 may determine that the portion of scan data, and thus the endpoint device 125, is not infected with malware.

Conversely, attributes classified as average and/or moderate attributes may be added to the third node of the framework using "OR" and/or "AND" operators. During scans of the endpoint device 125, the scanner server 105 and/or an agent (e.g., scanner client 140) may determine whether a portion of scan data associated with the endpoint device 125 matches a first average indicator OR a second average indicator OR a third average indicator, and so on. However, because average indicators are not known to be highly correlated with malware, the scanner server 105 may not immediately be able to determine that the portion of scan data, and thus the endpoint device 125, is infected with malware. Instead, the scanner server 105 may require a plurality of average indicators to be identified before it may be determined that the scan data portion is associated with malware. Thus, attributes classified as average indicators may be grouped and/or aggregated with other attributes classified as average indicators using "AND" operators into groups that, when identified collectively, are indicative of malware. As such, the logic of the third node may appear as: Group 1 (e.g., attribute 1 AND attribute 2 AND attribute 3) OR Group 2 (e.g., attribute 4 AND attribute 5), where attributes 1-5 are attributes classified as average indicators of malware, and where Groups 1 and 2 are both indicative of malware. As soon as a portion of the scan data is determined to match a plurality of average indicators that exceeds a predetermined threshold associated with the group of average indicators, the scanner server 105 may determine that the portion of scan data, and thus the endpoint device 125, is likely infected with malware.

Attributes classified as weak indicators of malware may be assigned to the fourth node of the framework using "OR" operators. During scans of the endpoint device 125, the scanner server 105 and/or an agent (e.g., scanner client 140) may determine whether a portion of scan data associated with the endpoint device 125 matches a first weak indicator OR a second weak indicator OR a third weak indicator, and so on. Because weak indicators are not known to be correlated with malware, if a portion of the scan data is determined to match one of the weak indicators, the scanner server 105 may not determine that the portion of scan data, and thus the endpoint device 125, is infected with malware. Instead, once identified, attributes classified as weak indicators of malware may be added to the fourth node as hashed values. In some embodiments, an attribute classified as a weak indicator of malware may be added to the fourth node in response to determining that an occurrence score of the attribute is below a predetermined threshold. Additionally, attributes that are filtered out as described above may be added to the fourth node of the framework.

Classifying attributes as known identifiers and/or known identifiers may be based on determining that attributes match hashed values in the first node of the framework (and/or the optional fifth node of the framework) during processing of scan data. However, classifying attributes as strong indicators, average indicators, and/or weak indicators may be slightly more complex. More particularly, the classification of attributes as strong indicators, average indicators, and/or weak indicators may be based on the determined weight, occurrence score, and/or attribute type of the attributes.

Each classification of strong indicators, average indicators, and/or weak indicators may be assigned a range of values to which weights of attributes are compared. For example, a weak indicator classification may be assigned a range of 0-50, an average indicator may be assigned a value range of 51-80, and a strong indicator classification may be assigned a value range of 81-100. These value ranges may be associated with a likelihood and/or confidence that attributes are indeed indicative of malware, including a particular malware family and/or variant.

Weights of identified attributes are compared against these value ranges (and/or threshold values associated with the value ranges) to determine a classification for the identified attributes. For example, if an attribute is assigned a weight of 18, the attribute will be classified as an average indicator. As another example, if an attribute is assigned a weight of 61, the attribute will be classified as an average indicator. As another example, if an attribute is assigned a weight of 93, the attribute will be classified as a strong indicator.

The scale and/or value ranges of each classification may be configured by a user and/or an administrator. In some embodiments, a weak indicator classification may be assigned a range of 0-50, an average indicator may be assigned a value range of 51-80, and a strong indicator classification may be assigned a value range of 81-100. In some embodiments, a weak indicator classification may be assigned a range of 0-50, an average indicator may be assigned a value range of 51-85, and a strong indicator classification may be assigned a value range of 86-100. In some embodiments, a weak indicator classification may be assigned a range of 0-50, an average indicator may be assigned a value range of 51-90, and a strong indicator classification may be assigned a value range of 91-100. In some embodiments, a weak indicator classification may be assigned a range of 0-50, an average indicator may be assigned a value range of 51-95, and a strong indicator classification may be assigned a value range of 96-100.

Each node of the malware detection framework described herein may be connected to each other via "OR" operators. The framework may also enable the scanner server 105 to compare any portion of received scan data, the data sample, and/or generated values to one or more predetermined threshold values at any point in time during processing. Additional nodes of the framework may be added, and nodes of the framework may also be subtracted and/or edited based on one or more user inputs, predetermined rules, received and/or processed data, and/or the like.

In this manner, the framework may be constructed by aggregating attributes (e.g., behaviors) of known malware variants and determining which of the aggregated attributes are most indicative of malware variants. The framework can continuously be updated and/or trained as described herein so as to detect unknown variants of a known malware family that exhibit common behavior as known variants of the same malware family. Advantageously, the framework, as well as device scans that utilize the framework, does not solely rely upon static known identifiers of malware, and instead can be used to detect new variants of malware that may have previously gone undetected.

In some embodiments, the scanner server 105 and/or the endpoint device 125 may be used to generate a parse tree that displays each attribute included in each node of the malware detection framework. A user may be enabled to modify the framework, modify attribute weights, modify attribute types, modify occurrence scores, modify nodes, modify groups of attributes, modify threshold values, modify value ranges for attribute classification, and/or any other data as desired. The parse tree may also display child-parent relationships between attributes in a node, such as groups of average attributes in the third node.

The framework may be exported as an Extensible Markup Language (e.g., XML) file type and may be recalled and/or updated by the scanner server 105 and/or the scanner client 140 during scans of the endpoint device. Other file types may also be used.

As used herein, attributes may include one or more file properties, dynamic attributes (e.g., registry modifications and/or file system changes), domain name server (DNS) requests, active and/or previous transmission control protocol (TCP) and/or Internet Protocol (IP) connections, serial numbers of hardware, identification numbers associated with malware and/or other software, a duration of time associated with operation of one or more processes, a runtime status of one or more processes and/or applications, multi-level attributes, running processes, previously executed processes, mutexes, and/or any combination thereof. As described herein, attributes may be indicative of threat behaviors typical of a malware family and/or a malware variant of the malware family.

Further Comments

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Brief Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

The invention claimed is:

1. A method comprising:
receiving, by at least one processing device of a computing apparatus, a data sample;
executing, by the at least one processing device, the data sample in a secure environment;
identifying, by the at least one processing device, an attribute comprised in the data sample;
determining, by the at least one processing device, whether the attribute is indicative of a malware family; and
classifying, by the at least one processing device, the attribute as one of a possible indicator of the malware family, and a known identifier of the malware family;
selecting, based on the classified attribute, a node of a framework for detecting the malware family;

determining, based on the classified attribute, whether to use at least one of a Boolean OR operator or a Boolean AND operator to add the classified attribute to the node of the framework for detecting the malware family;

adding, by the at least one processing device and using the determined Boolean operator for adding the classified attribute, the classified attribute to the selected node of the framework for detecting the malware family.

2. The method of claim 1, wherein determining whether the attribute is indicative of the malware family comprises:
determining, by the at least one processing device, a match between the attribute and a node entry of the node.

3. The method of claim 1, wherein the attribute is classified based on an attribute type of the attribute.

4. The method of claim 1, wherein the attribute is classified based on an attribute weight, wherein the attribute weight is determined by:
determining, by the at least one processing device, at least one of an attribute type and an occurrence for the attribute, wherein the occurrence is generated based on counting a number of times the attribute occurs in the data sample;
assigning, by the at least one processing device, a weight for the attribute based on at least one of the occurrence and the attribute type; and
comparing, by the at least one processing device, the weight to a threshold value associated with the node.

5. The method of claim 1, wherein the attribute is added to the node as a hashed value.

6. The method of claim 1, wherein the attribute comprises at least one of an input, a behavior, file properties, a system modification, a file system change, a registry modification, a domain name server (DNS) request, a Transmission Control Protocol (TCP) connection, and an Internet Protocol (IP) connection that is indicative of the malware family.

7. The method of claim 1, wherein a first classified attribute is added to a first node using a Boolean OR operator.

8. The method of claim 1, wherein a second classified attribute is added to a second node using a Boolean OR operator.

9. The method of claim 1, wherein one or more third classified attributes are aggregated into a group of attributes using Boolean AND operators and wherein the group of attributes is added to a third node using a Boolean OR operator.

10. The method of claim 1, wherein a fourth classified attribute is added to a fourth node using a Boolean OR operator.

11. The method of claim 1, wherein the attribute is classified as one of a strong attribute, a moderate attribute, a weak attribute, and a known identifier.

12. The method of claim 1, wherein classifying the attribute comprises classifying the attribute as a known non-identifier.

13. The method of claim 12, wherein the framework for detecting the malware family includes a fifth node associated with attributes classified as known non-identifiers and wherein the known non-identifier is added to the fifth node using a Boolean OR operator.

14. A computing apparatus comprising:
at least one memory comprising instructions; and
at least one processing device configured to execute the instructions, wherein executing the instructions causes the at least one processing device to perform the operations of:
receiving a data sample;
executing the data sample in a secure environment;
identifying an attribute comprised in the data sample;
determining whether the attribute is indicative of a malware family; and
classifying the attribute as one of a possible indicator of the malware family, and a known identifier of the malware family;
selecting, based on the classified attribute, a node of a framework for detecting the malware family;
determining, based on the classified attribute, whether to use at least one of a Boolean OR operator or a Boolean AND operator to add the classified attribute to the node of the framework for detecting the malware family;
adding, using the determined Boolean operator for adding the classified attribute, the classified attribute to the selected node of the framework for detecting the malware family.

15. The computing apparatus of claim 14, wherein determining whether the attribute is indicative of the malware family comprises:
determining, by the at least one processing device, a match between the attribute and an entry of the node.

16. The computing apparatus of claim 14, wherein the attribute is classified based on an attribute type of the attribute.

17. The computing apparatus of claim 14, wherein the attribute is classified based on an attribute weight, wherein the attribute weight is determined by:
determining, by the at least one processing device, at least one of an attribute type and an occurrence for the attribute, wherein the occurrence is generated based on counting a number of times the attribute occurs in the data sample;
assigning, by the at least one processing device, a weight for the attribute based on at least one of the occurrence and the attribute type; and
comparing, by the at least one processing device, the weight to a threshold value associated with the node.

18. The computing apparatus of claim 14, wherein the attribute is added to the node as a hashed value.

19. The computing apparatus of claim 14, wherein the attribute comprises at least one of an input, a behavior, file properties, a system modification, a file system change, a registry modification, a domain name server (DNS) request, a Transmission Control Protocol (TCP) connection, and an Internet Protocol (IP) connection that is indicative of the malware family.

20. A non-transitory computer-readable medium comprising code, wherein the code, when executed by at least one processing device of a computing apparatus, causes the at least one processing device to perform the operations of:
receiving a data sample;
executing the data sample in a secure environment;
identifying an attribute comprised in the data sample;
determining whether the attribute is indicative of a malware family; and
classifying the attribute as one of a possible indicator of the malware family, and a known identifier of the malware family;
selecting, based on the classified attribute, a node of a framework for detecting the malware family;
determining, based on the classified attribute, whether to use at least one of a Boolean OR operator or a Boolean AND operator to add the classified attribute to the node of the framework for detecting the malware family;

adding, using the determined Boolean operator for adding the classified attribute, the classified attribute to the selected node of the framework for detecting the malware family.

21. The non-transitory computer-readable medium of claim 20, wherein the code that, when executed by the at least one processing device, causes the at least one processing device to perform the operations of determining whether the attribute is indicative of the malware family further causes the at least one processing device to perform the operations of:

determining a match between the attribute and a second attribute comprised in the node.

22. The non-transitory computer-readable medium of claim 20, wherein the attribute is classified based on an attribute type of the attribute.

23. The non-transitory computer-readable medium of claim 20, wherein the attribute is classified based on an attribute weight, and wherein the attribute weight is determined by:

determining, by the at least one processing device, at least one of an attribute type and an occurrence for the attribute, wherein the occurrence is generated based on counting a number of times the attribute occurs in the data sample;

assigning, by the at least one processing device, a weight for the attribute based on at least one of the occurrence and the attribute type; and comparing, by the at least one processing device, the weight to a threshold value associated with the node.

24. The non-transitory computer-readable medium of claim 20, wherein the attribute is added to the node as a hashed value.

* * * * *